United States Patent
Parsons

(10) Patent No.: US 7,369,763 B2
(45) Date of Patent: May 6, 2008

(54) APPARATUS AND METHOD FOR MONITORING AN OPTICAL TRANSMISSION LINE

(75) Inventor: Nigel Richard Parsons, Kent (GB)

(73) Assignee: Alcatel, Paris (FR)

( * ) Notice: Subject to any disclaimer, the term of this patent is extended or adjusted under 35 U.S.C. 154(b) by 862 days.

(21) Appl. No.: 10/281,225

(22) Filed: Oct. 28, 2002

(65) Prior Publication Data

US 2003/0081280 A1  May 1, 2003

(30) Foreign Application Priority Data

Oct. 31, 2001  (GB) .................................. 0126166.8

(51) Int. Cl.
*H04B 10/08* (2006.01)
(52) U.S. Cl. ............................ 398/16; 398/17; 398/32; 398/33
(58) Field of Classification Search ............... 398/1–38, 398/84, 87, 95, 160
See application file for complete search history.

(56) References Cited

U.S. PATENT DOCUMENTS

| | | | | |
|---|---|---|---|---|
| 5,500,730 A | * | 3/1996 | Johnson | ..................... 356/73.1 |
| 5,767,956 A | * | 6/1998 | Yoshida | ..................... 356/73.1 |
| 6,185,020 B1 | * | 2/2001 | Horiuchi et al. | ............... 398/31 |
| 6,388,741 B1 | * | 5/2002 | Beller | ........................ 356/73.1 |
| 6,661,947 B2 | * | 12/2003 | Shirai | .......................... 385/24 |
| 6,771,358 B1 | * | 8/2004 | Shigehara et al. | ......... 356/73.1 |

FOREIGN PATENT DOCUMENTS

| | | |
|---|---|---|
| DE | 4428350 A1 | 3/1995 |
| EP | 0293086 A1 | 11/1988 |

\* cited by examiner

*Primary Examiner*—Dzung Tran
(74) *Attorney, Agent, or Firm*—Sughrue Mion, PLLC

(57) ABSTRACT

An apparatus and a method for monitoring an optical transmission line. An optical pilot signal of a predetermined duration is transmitted along said optical transmission line and a return signal is sent back from a signal returner along the same transmission line corresponding to at least part of said optical pilot signal. The signal returner is positioned at a predetermined point along the optical transmission line. An optical detection apparatus detects said optical pilot signal and also detects said return signal. A monitoring unit receives detection signals from said optical detection apparatus and determins the time relationship between the predetermined duration of the optical pilot signal and the round-trip transit time of the optical pilot signal. A first monitoring signal is generated when the determined time relationship has a predetermined value, and at least one further monitoring signal is generated in other cases.

26 Claims, 2 Drawing Sheets

APPARATUS AND METHOD FOR MONITORING AN OPTICAL TRANSMISSION LINE

BACKGROUND OF THE INVENTION

The present invention relates to a method and apparatus for monitoring an optical transmission line, and in particular for monitoring the safety of such.

In fibre-optical telecommunications there is an ever present demand for increases in optical data transmission rates and fibre-optical transmission distances. Attempts to meet the former demand typically involve an increase in the number of WDM (Wavelength Division Multiplexed) or DWDM (Dense Wavelength Division Multiplexed) optical channels used to transmit data along optical transmission lines, which typically requires transmission at high optical power levels in order to provide acceptable signal levels in each such channel. Similarly, attempts to meet the later demand requires the use of optical sources and/or optical amplifiers of increasingly high power, and increasingly intense pump sources therefor.

Accordingly, when using such high optical power levels it is preferable to employ a reliable safety mechanism for shutting-down the optical sources and/or optical amplifiers of a telecommunications line should the optical transmission line become broken or disconnected.

The high optical powers present in the transmission line may well be harmful to the human eye at least, and shutdown is generally desirable not only to render the system safe but also to notify of the break itself.

Typically, any acceptably reliable safety mechanism should have an equivalent failure rate no greater than 500 FITs (Failures In $10^9$ hours) in the detection of a break in a transmission line and the subsequent shut-down of the optical source for that line.

Many current safety mechanisms employ an optical splitter positioned on a transmission line at a predetermined point remote from the optical source. The splitter removes from the optical transmission line a small portion of the radiation passing along it. A loop-back optical fibre is connected to the output of the optical splitter and to an associated safety control unit which controls the optical source in dependence upon the loop-back signals being received via the loop-back fibre. If the loop-back signal is lost, as would be the case if either the loop-back fibre breaks or the optical transmission line breaks at a point between the optical source and the splitter, the optical source is shut down.

It will be readily appreciated in requiring a dedicated loop-back optical fibre, safety mechanism such as those described above are relatively expensive to produce in that additional fibres and optical splitters must be provided. Indeed, to implement the system within an N-fibre optical cable would require dedicating N/2 of those fibres to looping back the signals carried upon the other N/2 fibres. Thus, only half of the fibres within the cable would be available for data transmission.

SUMMARY OF THE INVENTION

Furthermore, it may not be possible to implement the safety mechanism in existing optical transmission cables if all the optical fibres therein are already in use (e.g. for data transmission), since no fibre could be spared for use as the loop-back fibre. Similarly, there may be no convenient location at which to place optical splitters along a transmission line if that line is inaccessible for example (e.g. within a submarine cable).

The present invention aims to overcome at least some of the aforementioned deficiencies in the prior art.

Stated in general terms, the present invention proposes monitoring the condition of an optical transmission by transmitting an optical pilot signal along a length of the optical transmission line, returning at least part of that pilot signal back along the transmission line and detecting that returned signal. The invention further proposes to determine if a predetermined temporal relationship exists with respect of the duration of the pilot signal and the round-trip transit time thereof. If this relationship is found to exist, the transmission line is considered to be subject to normal conditions, otherwise it is not.

For example, the duration of the pilot signal may be chosen with the aim of being substantially equal to the round-trip transit time of the leading edge of the pilot signal from and back to a pilot signal monitor via a signal returning element.

In this way the invention proposes to monitor a length of the transmission line through which the pilot signal propagates during its round-trip. If no breakages have occurred in that length of fibre then the front (e.g. leading edge) of the reflected pilot signal should reach the pilot signal monitor at a predetermined time relative to (e.g. substantially immediately after) the time at which the end (e.g. falling edge) of the pilot signal departs the monitor. Arrival/departure times of the front and back of the pilot signal at the monitor other than this would indicate abnormal operating conditions within the transmission line such as a fibre break.

Accordingly, in a first of its aspects, the present invention may provide an apparatus for monitoring an optical transmission line, the apparatus comprising:

a signal transmitter for transmitting an optical pilot signal of a predetermined duration along said optical transmission line;

a signal returner for returning back along said optical transmission line a return signal corresponding to at least part of said optical pilot signal, the signal returner being at a predetermined point along the optical transmission line;

optical detection apparatus for detecting said optical pilot signal and for detecting said return signal;

a monitoring unit for receiving detection signals from said optical detection apparatus, for determining the time relationship between the predetermined duration of the optical pilot signal and the round-trip transit time of the optical pilot signal from said optical detection apparatus to said signal returner and back to said optical detection apparatus, for generating a first monitoring signal when the determined time relationship has a predetermined value, and for generating at least one further monitoring signal in other cases.

Thus, it will be appreciated that the present invention in its first aspect provides a monitoring apparatus for monitoring the condition of an optical transmission line without the need for an additional dedicated loop-back fibre. Rather, the only fibre required is the very fibre being monitored. The placement of optical splitters along the transmission line is also unnecessary, thereby tending to reduce costs and ease of implementation of the present apparatus.

Only one optical pilot signal is required to monitor the transmission line according to the present invention, and this signal may be provided independently of any other signals (e.g. communications signals) propagating along the line.

Furthermore, both highly reflecting and low/non-reflective breaks within the line may be detected with this single pilot signal.

It is preferable that the duration of the pilot signal may be chosen with the aim of being substantially equal to the round-trip transit time of the leading edge of the pilot signal from and back to the optical detection apparatus via the signal returner. This amounts to a situation in which the predetermined value is substantially zero (i.e. that the relationship between the duration of the pilot signal and the round-trip transit time thereof is that of "equality"). Alternatively, the duration and round-trip transit time of the optical pilot signal could be chosen to differ by a positive value or a negative value corresponding to the former being greater than or less than the latter respectively.

However, more generally, the monitoring unit of the monitoring apparatus is preferably operable to compare detection signals received from said optical detection apparatus and to provide a first monitoring signal when the optical detection apparatus first detects the return signal at a time which differs from the time at which the end of the detected presence of the pilot signal occurs by an amount substantially equal to said predetermined value, the monitoring signal being indicative of a first operating condition of the monitoring unit and the transmission line.

For example, if the predetermined value is chosen to be zero (or "equality" in other words), then the first monitoring signal may be produced if the return signal is first detected at a time substantially immediately after the end of the detected presence of the optical pilot signal.

Thus, according to this example, if the pilot signal encounters no fibre breaks between the detection apparatus and the signal returner, the front of the return pilot signal will arrive at the detection apparatus substantially at the same time as the (un-returned and outgoing) back of the same pilot signal passes the detection apparatus and departs the monitoring apparatus.

The first monitoring signal preferably indicates substantially normal operating conditions in both the monitored transmission line and the monitoring apparatus (e.g. that the pilot signal source is functioning).

It is preferable that the first monitoring signal is produced when the monitoring unit determines that the time relationship in question has the predetermined value to within a predetermined tolerance margin. Physically speaking, allowance of this tolerance margin permits the first monitoring signal to be produced in the situation where, for example, the predetermined value is zero (or "equality" in other words) and the front of the return pilot signal arrives at the detection apparatus slightly after (but within the tolerance margin) the back of the same (outgoing) pilot signal has passed the detection apparatus.

Preferably, the tolerance margin is sufficient for the falling edge (back) of the pilot signal to fall below the detection threshold of the detection apparatus before the rising edge (front) of the return signal rises above that threshold.

The predetermined tolerance margin is preferably chosen in dependence upon the operating parameters of the overall monitoring apparatus, but preferably accounts for an error of a few per cent of the measurement of the time relationship in question. However, the value typically depends upon the optical power of the output pilot signal, and the round-trip transit distance of the signal. A tolerance margin permitting an error of up to approximately 10 per cent in the measurement of the time relationship is typically permissible.

The monitoring unit of the present invention is preferably operable to compare detection signals received from said optical detection apparatus and to provide a second monitoring signal, being one of said at least one further monitoring signals, when the optical detection apparatus first detects the return signal at a time which differs from the time at which the end of the detected presence of the pilot signal occurs by an amount less than said predetermined value, this monitoring signal being indicative of a second operating condition of the monitoring unit and the transmission line.

The second monitoring signal preferably indicates abnormal operating conditions in the monitored transmission line since early arrival of the return pilot signal would occur if that signal were returned by a reflective fibre break located between the detection apparatus and the location of the signal returner.

Preferably, the monitoring unit of the apparatus is operable to compare detection signals received from said optical detection apparatus and to provide a third monitoring signal, being one of said at least one further monitoring signals, when the optical detection apparatus detects the optical pilot signal and does not detect the return part of the optical pilot signal both during the detected presence of the optical pilot signal and after the end of the detected presence thereof, this monitoring signal being indicative of a third operating condition of the monitoring unit and the length of transmission line.

The third monitoring signal preferably indicates abnormal operating conditions in the monitored transmission line since non-arrival of the return pilot signal would occur if that signal had encountered a non-reflective fibre break located between the detection apparatus and the predetermined signal returner location.

The monitoring unit of the present apparatus is preferably operable to compare detection signals received from said optical detection apparatus and to provide a fourth monitoring signal, being one of said at least one further monitoring signals, when the optical detection apparatus detects neither an optical pilot signal nor a return part of the optical pilot signal, this monitoring signal being indicative of a fourth operating condition of the monitoring apparatus. The fourth monitoring signal preferably indicates abnormal operating conditions in the monitor since non-detection of an outgoing pilot signal and of a return pilot signal would occur if the pilot signal transmitter were inoperative.

Preferably, the signal transmitter comprises an optical pilot signal source optically coupled to the optical transmission line by an optical coupler. For example, the pilot signal source may be a semi-conductor laser or LED or the like, directly modulated to produce the pilot signal of a predetermined duration, or a semiconductor laser or LED providing a continuous output which may be subsequently modulated to form the pilot signal (e.g. by a Mach Zehnder optical modulator).

The optical coupler may be any of a range of known couplers, but is preferably a directional coupler for directing the pilot signal along the transmission line towards the signal returner located therein. More preferably, the coupler is a wavelength-selective coupler operable to couple to the optical transmission line optical radiation lying within a wavelength range including the optical pilot signal radiation.

Preferably, the pilot signal wavelength chosen to differ from the wavelengths of any other signals (e.g. data-channels) being transmitted along the transmission line, and the aforementioned wavelength range of the wavelength-selective coupler chosen to exclude the wavelengths of those other signals. This permits the pilot signal to be coupled to and from the transmission line substantially without interfering with other signals present thereon.

More preferably, the optical detection apparatus is operable to detect at a first detection location said optical pilot signal and to detect at a second detection location the return signal, and the predetermined duration of said optical pilot signal is substantially equal to the sum of the transit time of the optical pilot signal from said detection apparatus to said signal returner, and the transit time of the return signal from said signal returner to said detection apparatus.

Preferably, the optical detection apparatus comprises a first optical detector located at the first detection location and a second optical detector located at the second detection location. The second detection location may be separated from the first detection location.

The first detection location may be on the optical coupler adjacent the output of the optical pilot signal source and the second detection location may be on the optical transmission line. Alternatively, the first detection location and the second detection location may both be on the optical transmission line.

Preferably, the optical detectors of the optical detection apparatus are coupled to the optical transmission line (either directly or via an intermediate optical element) by optical couplers each being a wavelength-selective coupler operable to couple to/from the optical transmission line optical radiation lying within a wavelength range including the optical pilot signal radiation and excluding other signals (e.g. data channels) present in the transmission line. These optical coupler may be any of a range of known couplers, but are preferably appropriate directional couplers.

Preferably, the coupler of the first optical detector is operable to direct a portion of the outgoing pilot signal at the first detection location to the first detector, while the second optical detector is operable to direct a portion of the return pilot signal at the second detection location to the second detector. It is preferable that the coupler at the first detection location removes no or relatively little of the return signal radiation while the coupler at the second detection location removes no or relatively little of the outgoing signal radiation.

Any one or all of the aforementioned optical couplers are preferably WDM wavelength-selective directional couplers. However, other optical couplers may be used, such as couplers employing wavelength-selective optical filters, optical circulators and the like.

Preferably, the signal returner comprises a wavelength-selective in-line fibre grating operable to reflect optical radiation lying within a wavelength range including that of the optical pilot signal radiation. The signal returner may be other then a reflective grating, and may comprise a filter and ¼-wave plate for example. The means employed need merely be such that it collects at least some of the pilot signal radiation and returns it, along the same optical fibre, to the signal detection unit.

The wavelength range of the signal returner is preferably chosen to exclude the wavelength of any other optical signals (e.g. data channels) present in the transmission line. This permits the signal returner of the present apparatus to return the pilot signal but substantially transmit other optical signals.

The optical detection apparatus may be coupled to the optical transmission line at the second detection location by a wavelength-selective optical coupler operable to couple to the optical detection apparatus optical radiation propagating away from the signal returner and lying within a wavelength range including the optical pilot signal radiation.

According to a second aspect of the present invention, there is provided a fibre-optical telecommunications system comprising:
    an optical radiation source;
    a fibre-optical transmission line; and,
    an apparatus according to the first aspect of the present invention;
    wherein, the apparatus is operable to control the optical radiation source in dependence upon the monitoring signal provided by the monitoring unit.

Thus, it will be understood that the monitoring apparatus of the present invention in its first aspect may be applied to a fibre-optical telecommunications system so as to provide a safety monitoring and control function. Should an abnormal operating condition arise, as determined by the monitoring unit of the apparatus, the apparatus may shut-down an optical radiation source which provides radiation for e.g. data transmission along the transmission line.

It is to be appreciated that the present apparatus may be employed to control optical radiation sources of fibre-optical telecommunications system in other ways. For example, the monitoring unit may initiate a reduction in optical power output of the radiation source (e.g. to a level non-damaging to the human eye), or may initiate a re-routing of the radiation form the optical source to another transmission line, or may simply initiate an appropriate alarm signal. The monitoring unit may also control optical amplifiers within an optical telecommunications system, and pump lasers therefore, in a similar manner.

Preferably the first monitoring signal of the fibre-optical telecommunications system indicates substantially normal operating conditions of both the monitored transmission line and the monitoring apparatus, and the monitoring unit maintains the existing operating status of the optical radiation source while the first monitoring signal is maintained.

Preferably, the second monitoring signal fibre-optical communications system according indicates abnormal operating conditions in the monitored transmission line and normal operating conditions in the monitoring apparatus (e.g. that the pilot signal source is functioning), and the monitoring unit shuts-down the optical radiation source while the second monitoring signal is maintained. For example, the second monitoring signal may indicate a reflective break in the optical transmission line between the optical detection apparatus and the signal returner.

Preferably, the third monitoring signal of the fibre-optical communications system indicates abnormal operating conditions in the monitored transmission line and normal operating conditions in the monitoring apparatus (e.g. that the pilot signal source is functioning), and the monitoring unit shuts-down the optical radiation source while the third monitoring signal is maintained. The third monitoring signal may indicate a non-reflective break in the optical transmission line between the optical detection apparatus and the signal returner.

Preferably, the fourth monitoring signal of the fibre-optical communications system indicates abnormal operating conditions in the monitoring apparatus, and the monitoring unit shuts-down the optical radiation source while the fourth monitoring signal is maintained. The fourth monitoring signal may indicate that the optical pilot signal transmitter is inoperative.

According to a third aspect of the present invention, there is provided a method for monitoring an optical transmission line, the method comprising the steps of:
    transmitting an optical pilot signal of a predetermined duration along said optical transmission line;

determining whether or not said optical pilot signal is present at a first location;

returning at a predetermined point along said transmission line a return signal corresponding to at least a part of said optical pilot signal;

determining whether or not said return signal is present at a second location;

determining the time relationship between the predetermined duration of the optical pilot signal and the round-trip transit time of the optical pilot signal from said first detection location to said predetermined point and back to said second detection location; generating a first monitoring signal when the determined time relationship has a predetermined value, and generating at least one further monitoring signal in other cases.

For example, the monitoring signal according to the above method may be a first monitoring signal when the return signal is first determined to be present at said second location at a time which differs by an amount substantially equal to said predetermined value from the time at which the end of the detected presence of the pilot signal occurs at said first location, the monitoring signal being indicative of a first operating condition of the transmission line at least.

According to the above method, the monitoring signal may be a second monitoring signal, being one of said at least one further monitoring signals, when the return signal is first determined to be present at said second location at a time which differs by an amount less than said predetermined value from the time at which the end of the detected presence of the pilot signal occurs at said first location, the monitoring signal being indicative of a second operating condition of the transmission line at least.

Furthermore, according to the above method, the monitoring signal may be a third monitoring signal, being one of said at least one further monitoring signals, when the optical pilot signal is determined present at the first location and the return signal is determined to be absent at the second location both during the presence at the first location of the optical pilot signal and after the end of the presence thereof. This monitoring signal being indicative of a third operating condition in said transmission line at least.

Preferably, according to the above method, the monitoring signal is a fourth monitoring signal, being one of said at least one further monitoring signals, when neither the optical pilot signal nor a return signal are determined to be present at the first and second locations respectively. The fourth monitoring signal indicating a fourth monitoring condition in the optical transmission line at least.

The predetermined value may be a positive quantity, a negative quantity or be substantially zero. These values respectively correspond to the relationship between the duration of the pilot signal and the round-trip transit time being that the former is greater then, less than or equal to the latter.

The first monitoring signal may be produced when it is determined that the time relationship in question has the predetermined value to within a predetermined tolerance margin. Physically speaking, allowance of this tolerance margin permits the first monitoring signal to be produced in the situation where, for example, the predetermined value is zero and the front of the return pilot signal arrives at the second detection location slightly after (but within the tolerance margin) the back of the same (outgoing) pilot signal has passed the first detection location.

Preferably, the tolerance margin is sufficient for the falling edge (back) of the pilot signal to fall below the detection threshold of any detection apparatus before the rising edge (front) of the return signal rises above that threshold.

Preferably, according to the above method, the first detection location is separated from the second detection location. More preferably, the first and the second detection locations are on the optical transmission line.

Preferably, according to the above method, the optical pilot signal is provided by an optical pilot signal transmitter coupled to the optical transmission line by an optical coupler. Accordingly, the first detection location may be on the optical coupler and the second detection location is on the optical transmission line.

According to a fourth aspect of the present invention, there is provided a method of controlling a fibre-optical telecommunications system, the system comprising:

an optical radiation source;

a fibre-optical transmission line;

a transmission line monitoring unit;

wherein, the optical radiation source of the system is controlled by the monitoring unit in dependence upon monitoring signals provided thereby according to monitoring method of the third aspect of the invention.

Preferably, in the method of controlling a fibre-optical telecommunications system, the first monitoring signal indicates substantially normal operating conditions of both the monitored transmission line and the monitoring apparatus, and the monitoring unit maintains the existing operating status of the optical radiation source while the first monitoring signal is maintained.

Preferably, in the method of controlling a fibre-optical telecommunications system, the second monitoring signal indicates abnormal operating conditions in the monitored transmission line and normal operating conditions in the monitoring apparatus, and the monitoring unit shuts-down the optical radiation source while the second monitoring signal is maintained. The second monitoring signal may indicate a reflective break in the optical transmission line between the optical detection apparatus and the signal returner.

Preferably, in the method of controlling a fibre-optical telecommunications system, the third monitoring signal indicates abnormal operating conditions in the monitored transmission line and normal operating conditions in the monitoring apparatus, and the monitoring unit shuts-down the optical radiation source while the third monitoring signal is maintained. The third monitoring signal may indicate a non-reflective break in the optical transmission line between the optical detection apparatus and the signal returner.

Preferably, in the method of controlling a fibre-optical telecommunications system, the fourth monitoring signal indicates abnormal operating conditions in the monitoring apparatus, and the monitoring unit shuts-down the optical radiation source while the fourth monitoring signal is maintained. The fourth monitoring signal may indicate that the optical pilot signal transmitter is inoperative.

BRIEF DESCRIPTION OF THE DRAWINGS

There now follows a detailed description of a non-limiting embodiment of the present invention, with reference to the following drawings, in which.

DETAILED DESCRIPTION OF THE INVENTION

Figure 1:
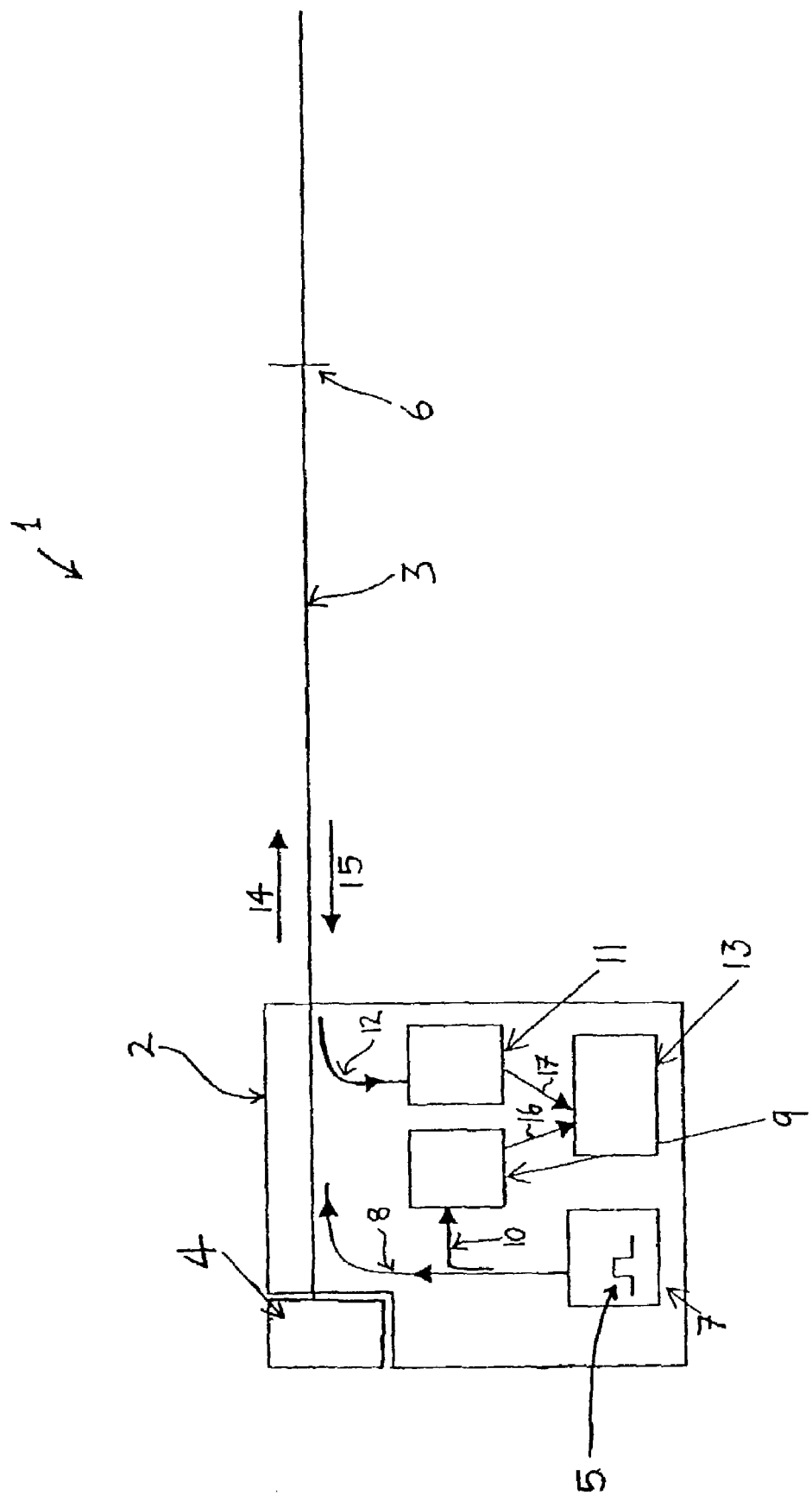
FIG. 1 illustrates a part of a fibre-optical telecommunications system comprising a monitoring unit according to the present invention.

Referring to FIG. 1, there is illustrated part of an optical telecommunications system generally identified by numeral 1. The system includes a high-power optical radiation source 4 for providing the optical radiation for any optical data/communications channels which are to be transmitted along the fibre 3. The system also includes elements of the monitoring apparatus of the present invention, collectively identified by numeral 2, and coupled to an optical fibre 3. An in-line wavelength-selective fibre grating 6 is located within (and forming a part of) fibre 3 at a predetermined point along the fibre distant from elements 2. In being so placed, the combination of elements 2 and grating 6 provides a monitoring apparatus which is able to monitor the condition of the length of optical fibre between elements 2 and grating 6.

Elements 2 include an optical pilot signal source 7 comprising a semiconductor laser operable to be modulated directly or by an optical modulator (not shown) so as to provide a pulse of substantially constant intensity (as indicated by pulse 5) and of a predetermined duration $T_{pilot}$. A wavelength-selective directional optical coupler 8 is connected to an output of pilot signal source 7 and couples the optical output therefrom to the fibre 3 of the telecommunications system, in such a way as to direct the pilot signal along the fibre 3 towards the fibre grating 6.

The optical coupler 8 is operable to insert the pilot signal from source 7 into fibre 3 yet at the same time not remove data/communications channel radiation form source 4 from fibre 3. This is achieved by ensuring the transmission characteristics of coupler 8 permit transmission of pilot signal radiation, but not of data/communications channel radiation. The wavelength of pilot signal radiation may suitably be chosen to be in a lower loss part of the transmission spectrum of the fibre, at approximately 1520 nm-1560 nm. This value should preferably be sufficiently distant from commonly used data transmission wavelengths yet still reside within a non-attenuating region of typical optical fibres 3.

A first optical detector 9 is optically coupled to the optical coupler 8 via an optical coupler 10 located at a first detection location proximate the output of the pilot signal source 7. At this location coupler 10 taps-off a portion of any optical pilot signal radiation emanating therefrom, and to direct that portion of radiation to the optical input of the first optical detector 9. Similarly, a second optical detector 11 is optically coupled to the optical fibre 3 via an optical coupler 12 (similar to coupler 8) located at a second detection location thereupon so as to direct a portion of any reflected optical pilot signal radiation propagating along the optical fibre 3 from the direction of the in-line grating 6. The coupler 12 directs that portion of reflected pilot radiation to the optical input of the second detector 11.

The first and second optical detectors 9 and 11 are operable to detect whether or not a pilot signal is present at the first and second detection locations respectively, and to provide a detection signal indicating this accordingly. Each one of the first and second optical detectors 9 and 11 provides a detection signal output 16 and 17 respectively, via which the detectors are connected to a detection signal input of a monitor 13. The monitor 13 is thus operable to provide a monitoring signal in dependence upon detection signals it receives from the first and second detectors and to control the high-power optical source 4 in accordance with these monitoring signals.

In use, the apparatus operates as follows. The pilot signal source 7 produces a pilot signal 5 of a duration $T_{pilot}$ which is predetermined to be equal to the transmit time $T_{Transit}$ of the pilot signal from the first detection location (where the coupler 10 is located) to the reflecting fibre-grating 6 within the optical fibre 3 of the transmission line being monitored, and back to the second detection location (where the coupler 12 is located).

The pilot signal is output from the signal source 7 and passes through the coupler 8 whereupon a portion of the signal is removed from that coupler by coupler 10 and directed into the first optical detector 9 which thereupon indicates that the pilot signal is present at the first detection location. The remaining pilot signal is subsequently transmitted into and along the optical fibre 3 towards the reflective grating 6 by the optical coupler 8 as indicated by arrow 14 in FIG. 1.

Subsequent to reflection by the fibre grating 6, the reflected pilot signal propagates along the optical fibre 3 back towards the elements 2 as indicated by arrow 15 of FIG. 1. Upon reaching the second detection location, at least a portion of the reflected pilot signal is removed from the optical fibre 3 by the optical coupler 12, whereupon it is directed into the second optical detector 11 which then indicates that the reflected portion of the pilot wave is present at the second detection location.

It is to be noted that the pulse duration $T_{pilot}$ is predetermined to be substantially equal to the unimpeded round-trip transit time $T_{Transit}$ of the pilot signal from the location of coupler 10 to the reflector 6 and back to the coupler 12. Thus, once the first detector 9 detects (at a point in time T, say) the presence of the pilot signal at the first detection location, it should continue to do so for a further $T_{pulse}$ seconds while the entire signal pulse passes that location. Similarly, the reflected leading edge of the pilot signal will be first detected at the second detection location at a time $T_{Transit}$ seconds after the point in time T. Thus, since $T_{pilot}$ is predetermined to be substantially equal to the transmit time $T_{Transit}$, the leading edge of the reflected pilot signal should be first detected at the second detection location substantially immediately after the pilot signal is no longer detected at the first detection location (i.e. the falling edge has just passed).

Any other relative time relationship between the front and back of the pilot signal indicates abnormal conditions within the optical fibre between the first detection location and the fibre grating 6 or of a failure in the pilot signal source itself.

Figure 2:
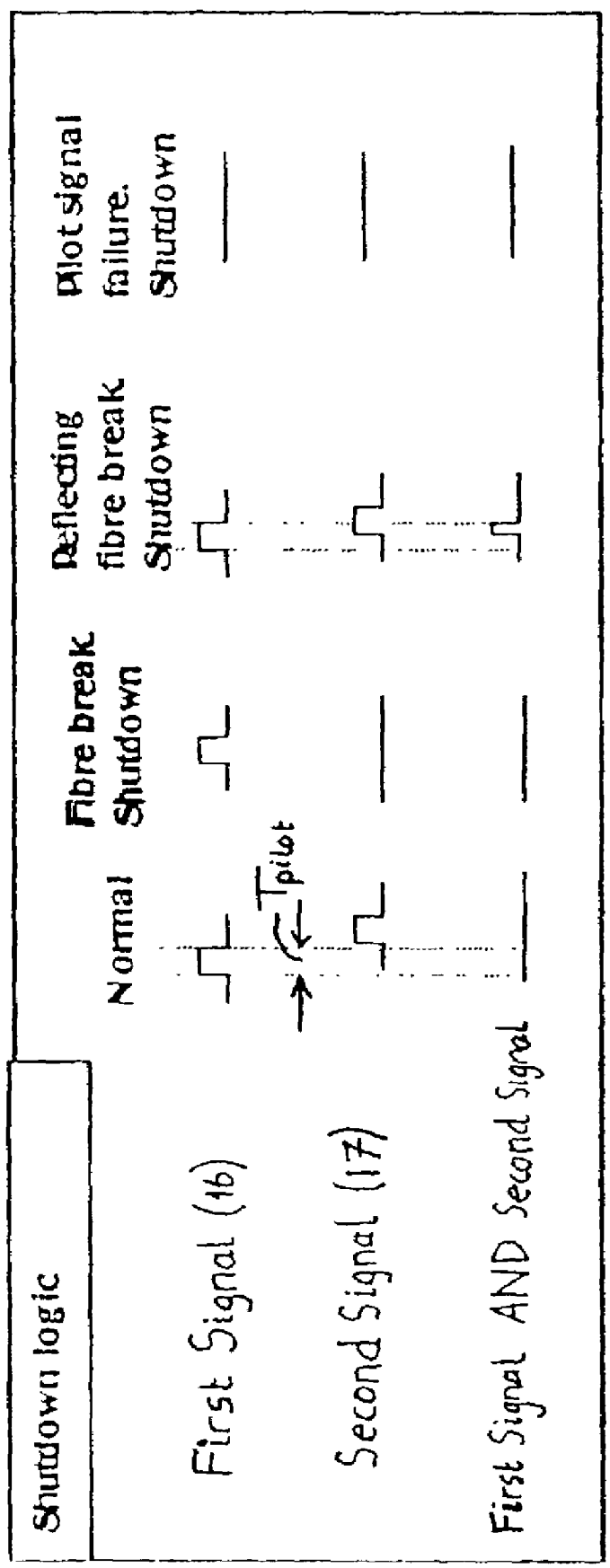
FIG. 2 illustrates a shut-down logic table for shutting-down an optical radiation source of a fibre-optical telecommunications system in accordance with the present invention.

FIG. 2 illustrates the logic via which the monitoring unit 13 interprets the detection signals input to it by the first and second detectors 9 and 11, and how the optical source 4 is controlled by the monitor 13 accordingly:

The monitor 13 provides a first monitoring signal, indicating "normal" operating conditions, when the second optical detector first detects the reflected part of the pilot signal at a time substantially immediately succeeding the end of the detected presence of the optical pilot signal by the first optical detector. The optical source 4 is not shutdown under these conditions. FIG. 2 illustrates the detection signals provided by first detector 9 and by second detector 11, as a function of time.

As will be seen, signal 17 signal substantially immediately succeeds signal 16, and the two detectors never simultaneously detect the pilot signal. The monitoring unit compares signals 16 and 17 by determining the logical AND of the detection signals. Under the aforementioned conditions, this logic state is always logic "zero" and the monitoring unit generated the first monitoring signal accordingly.

The monitor 13 provides a second monitoring signal, indicating a "reflecting fibre break" in the optical fibre 3, when the second and first optical detectors detect simultaneously both the reflected part of the optical pilot signal and the optical pilot signal respectively. Thus, the leading edge of the pilot signal has been reflected back to the second detector 11 before reaching the grating 6. The monitor 13 shuts-down the optical source 4 under these conditions. Again, FIG. 2 illustrates the detection signals provided by first detector 9 and by second detector 11, as a function of time. As will be seen, a portion of signal 17 substantially overlaps signal 16, and the two detectors simultaneously detect the pilot signal during this overlap period. Consequently, in comparing signals 16 and 17, monitor 13 produces the logical AND of the detection signals which, during the overlap time, is logic "one".

The monitor 13 provides a third monitoring signal, indicating a non-reflective break in the optical fibre 3, when the first optical detector 9 detects said optical pilot signal and the second detector 11 does not detect the reflected part of the optical pilot signal both during the detected presence of the optical pilot signal and succeeding the end of the detected presence thereof. Thus, due to the break, none of the signal (and in particular the leading edge of the pilot signal) has not been able to reach the grating 6. The monitor 13 shuts-down the optical source 4 under these conditions. Thus, since no detection signal 17 is produced, the logical AND of the detection signals 16 and 17 determined by monitor 13, as a function of time, is always logic "zero".

The monitor provides a fourth monitoring signal when neither of the first and second detectors 9 and 11 detect an optical pilot signal nor a reflected part of the optical pilot signal respectively. Thus, the pilot signal source 7 has failed and the monitor 13 shuts-down the optical source 4. Thus, since neither detection signal 16 nor 17 is produced, the logical AND of the detection signals 16 and 17 determined by monitor 13, as a function of time, is always logic "zero".

Thus, shut-down occurs if:
1) the logical AND of signals 16 and 17 is "zero"; or
2) no outgoing pulse is detected; or
3) no return pulse is detected.

It is to be appreciated that modifications and variations to the embodiments described above may be made without departing from the scope of the present invention in any of its aspects.

What is claimed is:

1. An apparatus for monitoring an optical transmission line, the apparatus comprising:
   a signal transmitter for transmitting an optical pilot signal of a predetermined duration along said optical transmission line;
   a signal returner for returning back along said optical transmission line a return signal corresponding to at least part of said optical pilot signal, the signal returner being at a predetermined point along the optical transmission line;
   optical detection apparatus for detecting said optical pilot signal and for detecting said return signal;
   a monitoring unit for receiving detection signals from said optical detection apparatus, for determining the time relationship between the predetermined duration of the optical pilot signal and the round-trip transit time of the optical pilot signal from said optical detection apparatus to said signal returner and back to said optical detection apparatus, for generating a first monitoring signal when the determined time relationship has a predetermined value, and for generating at least one further monitoring signal in other cases.

2. An apparatus according to claim 1 wherein the monitoring unit is operable to compare detection signals received from said detection apparatus and to provide said first monitoring signal when the optical detection apparatus first detects the return signal at a time which differs from the time at which the end of the detected presence of the pilot signal occurs by an amount substantially equal to said predetermined value, the monitoring signal being indicative of a first operating condition of the monitoring unit and the transmission line.

3. An apparatus according to claim 1 wherein the monitoring unit is operable to compare detection signals received from said detection apparatus and to provide a second monitoring signal being one of said at least one further monitoring signals when the optical detection apparatus first detects the return signal at a time which differs from the time at which the end of the detected presence of the pilot signal occurs by an amount less than said predetermined value, the second monitoring signal being indicative of a second operating condition of the monitoring unit and the transmission line.

4. An apparatus according to claim 1 wherein the monitoring unit is operable to compare detection signals received from said detection apparatus and to provide a third monitoring signal being one of said at least one further monitoring signals when the optical detection apparatus detects said optical pilot signal and does not detect the return signal both during the detected presence of said optical pilot signal and after the end of the detected presence thereof, the third monitoring signal being indicative of a third operating condition of the monitoring unit and the length of transmission line.

5. An apparatus according to claim 1 wherein the monitoring unit is operable to compare detection signals received from said detection apparatus and to provide a fourth monitoring signal being one of said at least one further monitoring signals when the optical detection apparatus detects neither the optical pilot signal nor the return signal, the fourth monitoring signal being indicative of a fourth operating condition of the monitoring unit.

6. An apparatus according to claim 1 wherein said predetermined value is a positive or a negative quantity corresponding in either case to a predetermined difference between said pilot signal duration and said pilot signal round-trip transit time.

7. An apparatus according to claim 1 wherein said predetermined value is substantially zero and corresponds to a time relationship of equality between said pilot signal duration and said pilot signal round-trip transit time.

8. An apparatus according to claim 1 wherein said signal transmitter comprises an optical pilot signal source optically coupled to said optical transmission line by an optical coupler.

9. An apparatus according to claim 8 wherein the optical coupler is a wavelength-selective coupler operable to couple to said optical transmission line optical radiation lying within a wavelength range including said optical pilot signal radiation, and to direct said radiation towards said signal returner.

10. An apparatus according to claim 1 wherein said optical detection apparatus is operable to detect at a first detection location said optical pilot signal and to detect at a second detection location the return signal, and the predetermined duration of said optical pilot signal is substantially equal to the sum of the transit time of the optical pilot signal from said detection apparatus to said signal returner, and the transit time of the return signal from said signal returner to said detection apparatus.

11. An apparatus according to claim 10 wherein said optical detection apparatus comprises a first optical detector located at said first detection location and a second optical detector located at said second detection location.

12. An apparatus according to claim 10 wherein said second detection location is separated from said first detection location.

13. An apparatus according to claim 12 wherein said first detection location is on said optical coupler adjacent the output of said optical pilot signal source and said second detection location is on said optical transmission line.

14. An apparatus according to claim 10 wherein said first detection location and said second detection location are on said optical transmission line.

15. An apparatus according to claim 1 wherein said signal returner comprises a wavelength-selective in-line fibre grating operable to reflect optical radiation lying within a wavelength range including said optical pilot signal radiation.

16. An apparatus according to claim 1 wherein said optical detection apparatus is coupled to said optical transmission line at said second detection location by a wavelength-selective optical coupler operable to couple to said optical detection apparatus optical radiation propagating away from said signal returner and lying within a wavelength range including said optical pilot signal radiation.

17. A fibre-optical telecommunications system comprising:
    an optical radiation source;
    a fibre-optical transmission line; and, an apparatus for monitoring the optical transmission line, the apparatus comprising:
    a signal transmitter for transmitting an optical pilot signal of a predetermined duration along said optical transmission line;
    a signal returner for returning back along said optical transmission line a return signal corresponding to at least part of said optical pilot signal, the signal returner being at a predetermined point along the optical transmission line;
    optical detection apparatus for detecting said optical pilot signal and for detecting said return signal;
    a monitoring unit for receiving detection signals from said optical detection apparatus, for determining the time relationship between the predetermined duration of the optical pilot signal and the round-trip transit time of the optical pilot signal from said optical detection apparatus to said signal returner and back to said optical detection apparatus, for generating a first monitoring signal when the determined time relationship has a predetermined value, and for generating at least one further monitoring signal in other cases wherein,
    said apparatus is operable to control said optical radiation source in dependence upon the monitoring signals provided by said monitoring unit.

18. A method for monitoring an optical transmission line, the method comprising the steps of:
    transmitting an optical pilot signal of a predetermined duration along said optical transmission line;
    returning at a predetermined point along said transmission line a return signal corresponding to at least a part of said optical pilot signal;
    determining if said optical pilot signal is present at a first location;
    determining if said return signal is present at a second location;
    determining the time relationship between the predetermined duration of the optical pilot signal and the round-trip transit time of the optical pilot signal from said first detection location to said predetermined point and back to said second detection location;
    generating a first monitoring signal when the determined time relationship has a predetermined value, and generating at least one further monitoring signal in other cases.

19. A method according to claim 18 wherein the monitoring signal is a first monitoring signal when the return signal is first determined to be present at said second location at a time which differs by an amount substantially equal to said predetermined value from the time at which the end of the detected presence of the pilot signal occurs at said first location, the monitoring signal being indicative of a first operating condition of the transmission line at least.

20. A method according to claim 18 wherein the monitoring signal is a second monitoring signal being one of said at least one further monitoring signals when the return signal is first determined to be present at said second location at a time which differs by an amount less than said predetermined value from the time at which the end of the detected presence of the pilot signal occurs at said first location, the second monitoring signal being indicative of a first operating condition of the transmission line at least.

21. A method according to claim 18 wherein the monitoring signal is a third monitoring signal being one of said at least one further monitoring signals when the optical pilot signal is present at said first location and said return signal is not present at said second location both during the detected presence of said optical pilot signal and after the end of the detected presence thereof, the third monitoring signal being indicative of a first operating condition of the transmission line at least.

22. A method according to claim 18 wherein the monitoring signal is a fourth monitoring signal being one of said at least one further monitoring signals when neither said optical pilot signal nor said return signal are present at said first and second locations respectively, the fourth monitoring signal being indicative of a first operating condition of the transmission line at least.

23. A method according to claim 18 wherein said first detection location is separated from said first detection location.

24. A method according to claim 18 wherein said first and said second detection locations are on said optical transmission line.

25. A method according claim 18 wherein said optical pilot signal is provided by an optical pilot signal transmitter coupled to said optical transmission line by an optical coupler.

26. A method according to claim 18 wherein said first detection location is on said optical coupler and said second detection location is on said optical transmission line.

* * * * *